（12） United States Patent
Hering et al.

(10) Patent No.: US 8,860,243 B2
(45) Date of Patent: Oct. 14, 2014

(54) POWER SUPPLY DEVICE AND UNIT

(75) Inventors: Torsten Hering, Uberlingen (DE); Axel Michael Mueller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 887 days.

(21) Appl. No.: 13/045,709

(22) Filed: Mar. 11, 2011

(65) Prior Publication Data

US 2011/0241420 A1   Oct. 6, 2011

(30) Foreign Application Priority Data

Mar. 31, 2010  (DE) .......................... 10 2010 003 509

(51) Int. Cl.
*B60L 1/00* (2006.01)
(52) U.S. Cl.
CPC ........................................ *B60L 1/00* (2013.01)
USPC ........................................... 307/9.1; 307/10.1
(58) Field of Classification Search
CPC ..................................... B60L 1/00; B60L 7/00
USPC ............................................................ 307/10.1
See application file for complete search history.

(56) References Cited

U.S. PATENT DOCUMENTS

| 5,893,777 | A  | * | 4/1999  | Kantor .......................... 439/550 |
| 7,876,104 | B2 | * | 1/2011  | Tarasinski .................... 324/503 |
| 7,960,857 | B2 | * | 6/2011  | King ............................ 307/10.1 |
| 8,295,950 | B1 | * | 10/2012 | Wordsworth et al. ........... 700/22 |
| 2007/0024231 | A1 | * | 2/2007 | Lee et al. ....................... 318/802 |
| 2010/0229581 | A1 | * | 9/2010 | Truckenbrod et al. .......... 62/236 |
| 2011/0118917 | A1 | * | 5/2011 | Lim et al. ....................... 701/22 |

FOREIGN PATENT DOCUMENTS

DE           103 05 908 A1    9/2004
DE       10 2005 019 362 A1   11/2006

* cited by examiner

*Primary Examiner* — Rexford Barnie
*Assistant Examiner* — Toan Vu
(74) *Attorney, Agent, or Firm* — Davis & Bujold, PLLC; Michael J. Bujold

(57) ABSTRACT

A power supply device for a unit that is to be supplied with electrical energy and typically arranged on a commercial vehicle trailer, for example. The power supply device comprises an electro-hybrid drive system for a commercial vehicle and a supply unit which is designed to convert a direct voltage, from a high-voltage system of the electro-hybrid drive system, into a three-phase alternating voltage. The supply unit comprises an output which transmit the three-phase alternating voltage for supplying power to the unit. The output is designed to form a standardized interface together with the unit. In addition, the unit which can be connected to the power supply device is one of a refrigerator unit, a concrete mixer, a concrete pump or a shredder.

11 Claims, 1 Drawing Sheet

POWER SUPPLY DEVICE AND UNIT

This application claims priority from German patent application serial no. 10 2010 003 509.2 filed Mar. 31, 2010.

FIELD OF THE INVENTION

The present invention concerns a power supply device for supplying electric power to a unit arranged on a trailer of a commercial vehicle, the unit being a high-power unit for example in the range of 10 kW to 40 kW such as a refrigerator unit, a concrete mixer, a concrete pump or a shredder, wherein the commercial vehicle comprises an electro-hybrid system for drive purposes which, in a known manner, includes a high-voltage system.

BACKGROUND OF THE INVENTION

Usually, commercial vehicles (HGV) such as semi-trailer tractors have a conventional HGV on-board main power supply that can supply typical automotive consumers up to a maximum power of around 1.5 kW. Electric consumers with higher power demand, such as air-conditioning units, therefore often require additional generators to provide electrical energy. Moreover, semi-trailers or commercial vehicle trailers equipped with electric units such as refrigerator units, concrete mixers, concrete pumps or shredders, etc., are also equipped with expensive power supply units such as electric generators which allow self-sufficient operation of the unit even when the trailer is parked and disconnected from the tractor machine. Such current supply units, for example with the power rating mentioned above, are extremely costly and not very well standardized.

SUMMARY OF THE INVENTION

Starting from there the purpose of the present invention is to propose a power supply device and a unit, more especially a refrigerator unit, a concrete mixer, a concrete pump or a shredder, which overcome the drawbacks of the prior art and enable the realization of a suitable power supply device and a standardized unit interface.

According to the invention, this objective is achieved in relation to the power supply device by the characteristics specified in the disclosure. In relation to the unit the objective is achieved by the characteristics specified in the disclosure.

According to the invention a power supply device is proposed for a unit that is to be supplied with electrical energy and is arranged on a trailer of a commercial vehicle, for example a refrigerator unit, a concrete mixer, a concrete pump or a shredder, etc., such that the power supply device comprises an electro-hybrid drive system for the commercial vehicle and a supply device provided for converting a direct voltage from a high-voltage system of the electro-hybrid drive system into a three-phase alternating voltage, the supply device having an output for providing the three-phase alternating voltage for supplying power to the unit, such that the output is designed to form a standardized interface together with the unit.

In an embodiment of the power supply device according to the invention, the output for forming an interface is designed in the form of an industrial-grade, three-phase alternating-current plug-and-socket connection.

In another embodiment of the power supply device according to the invention, the output comprises an industrial-grade three-phase alternating-current plug socket (female) for forming the interface.

In still another embodiment of the power supply device according to the invention, the supply device comprises an inverter for converting the direct voltage into three-phase alternating voltage, and a transformer for stepping up or stepping down the three-phase alternating voltage. Thanks to the use of the transformer, in addition the supply network is advantageously conductively separated from the consumer, i.e. the unit.

According to the invention a power supply device is also proposed, in which at the output of the supply unit an industrial alternating current at 400 V and 50 Hz is available.

According to one aspect of the power supply device according to the invention, the power supply device is designed to be releasably connected to the high-voltage system, in particular for releasable plug-in connection.

According to a further aspect of the power supply device according to the invention, the supply device is arranged on a commercial vehicle trailer or on a commercial vehicle.

Also proposed according to the invention is a unit, for example a refrigerator unit, concrete mixer, concrete pump or a shredder, etc., for connection with a power supply device according to the invention, which is arranged on a commercial vehicle trailer, to enable connection with various power supply devices the unit has a single input designed to form a standardized interface together with the power supply device.

In an embodiment of the unit according to the invention, the input of the unit for forming an interface is designed in the form of an industrial-grade three-phase alternating-current plug-and-socket connection.

In another embodiment of the unit according to the invention, for forming an interface the unit comprises an industrial-grade three-phase alternating-current plug (male).

Further features and advantages of the invention emerge from the description given below of example embodiments of the invention, with reference to the figures in the drawing, which illustrate details essential to the invention, and from the claims. The individual features can be implemented individually or more than one at a time in any desired combination in variants of the invention.

BRIEF DESCRIPTION OF THE DRAWINGS

Preferred embodiments of the invention are explained in more detail below with reference to the attached drawings, which show.

DETAILED DESCRIPTION OF THE PREFERRED EMBODIMENTS

Figure 1:
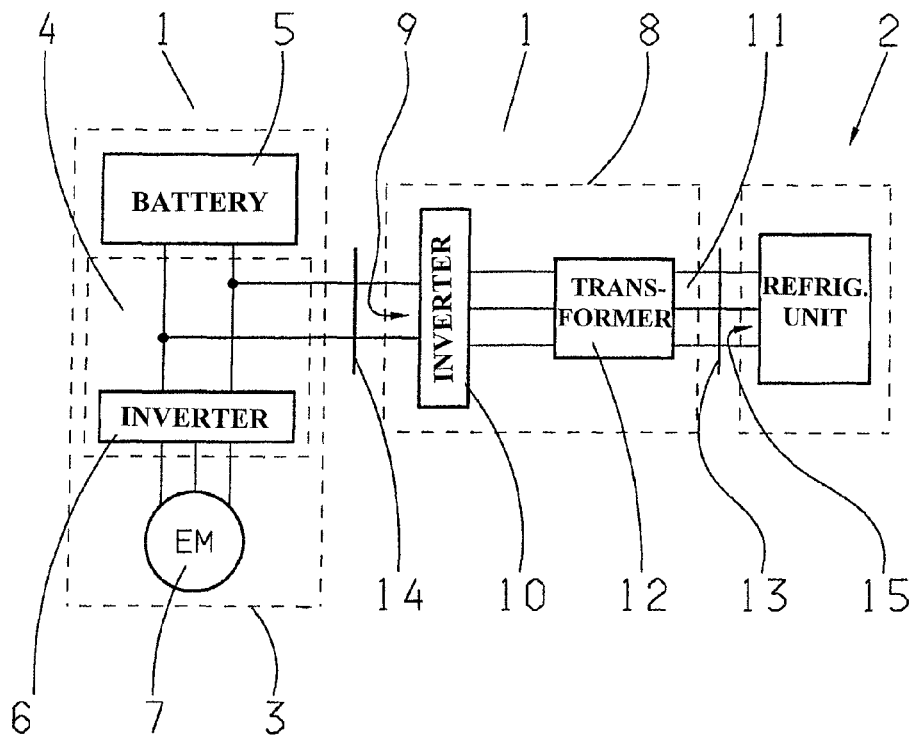
FIG. 1: As an example, the power supply device and a unit, according to a possible embodiment of the invention.

In the following description and the drawing, the same indexes are used for elements with the same or a comparable function.

FIG. 1 shows, diagrammatically and as an example, a power supply device according to the invention with a unit 2 according to the invention arranged on it, in this case a refrigerator unit. Instead of the refrigerator unit other units could of course be provided, such as a concrete mixer, a concrete pump, or a shredder, etc. The power supply device 1 is designed to supply the unit 2 with electrical energy as necessary, and it is conceivable also to supply other or additional electrical consumers from the power supply device 1.

The power supply device 1 comprises an electro-hybrid drive system 3 arranged in a vehicle, in particular a commercial vehicle such as a (semi-trailer) tractor with a hybrid drivetrain. In the vehicle the electro-hybrid drive system 3 serves to provide drive power in a known manner. The electro-hybrid drive system 3 comprises a high-voltage system 4 with a high-voltage battery 5, from which energy can be drawn for operating the electro-hybrid drive system 3 or for driving purposes or, for example, to which energy can be delivered in a known manner as a result of a deceleration of the vehicle. The high-voltage battery 5 can have a battery voltage of a few hundred volts, for example 340 V.

Electrically connected to the high-voltage battery 5 and part of the high-voltage system 4 is, for example, an inverter 6 which, for the actuation of an electric motor 7 of the electro-hybrid drive system 3 to be powered, delivers energy drawn from the high-voltage battery 5 to the electric motor 7. The inverter 6 delivers energy drawn from the intermediate circuit to the electric motor 7 as necessary, and to control the inverter 6 an electronic system (not shown in FIG. 1) is provided. Besides the electric motor 7, the electro-hybrid drive system 3 also comprises, as is known, an internal combustion engine for driving purposes, which can also be used for charging the high-voltage battery 5, but which is also not shown in FIG. 1.

It is envisaged to use the power supply device 1 in particular for operating a unit 2, in the case illustrated a refrigerator unit, this being arranged for example on a commercial vehicle trailer, such as a semi-trailer which can be moved by a hybrid-operated tractor. Besides other applications refrigerator units serve, for example, to refrigerate foodstuffs during transport and to ensure that the refrigeration chain is not interrupted. During this it is clear that the unit 2 must remain operable even when the trailer is parked and disconnected. A unit 2 in the form of a concrete mixer, concrete pump or shredder must also remain operable in the parked condition at the place of use, for example a building site, for a longer period.

For that purpose it is routine to design the unit 2 such that it can be operated from a power supply device of the trailer, a power supply unit of the commercial vehicle or a stationary power supply device, so that different interfaces with different supply parameters (current, voltage, power etc.) are used.

In accordance with the invention, in order to form a uniform interface (i.e. connection point for equipment) for various power supply units, the power supply unit 1 comprises a supply unit 8 which is or can be electrically connected to the electro-hybrid drive system 3 and from which it can draw electrical energy. The supply unit 8 can be connected by means of an input 9 to the high-voltage battery 5, so that the battery voltage of the high-voltage battery 5 is applied at the input 9. Alternatively, to draw energy the input 9 can for example be connected to the intermediate circuit of the inverter 6, for example so that the intermediate circuit voltage is applied at the input 9. In the case when the supply unit 8 can be supplied with the battery voltage of the high-voltage battery 5, the supply unit 8 itself, for example, also comprises an inverter 10.

In the present case the supply unit 8 is designed to be connected to the intermediate circuit of the inverter 6 of the electro-hybrid drive system 3. In this case the supply unit 8 comprises the inverter 10, which is connected to the input 9 and can be acted upon by energy from the intermediate circuit. The inverter 10 is for example a pulse-type inverter, which serves as a voltage and frequency adjusting device.

Furthermore, the supply unit 8 is designed to provide a voltage level at an output 11, which can serve to form a uniform interface. For this purpose the supply unit 8 comprises in particular a transformer 12 connected downstream from the inverter 10, which converts an output voltage of the inverter 10 to the voltage level of an interface 13 according to the invention provided for operating the unit 2.

To be able to operate the unit 2 from stationery, vehicle-mounted or trailer-mounted power supply systems, it is envisaged to design the output 11 of the supply unit 8 as a three-phase alternating-current output, so that the formation of a standardized interface 13 is possible inasmuch as stationary or trailer-mounted power supply units can also make use of a three-phase alternating-current output. In particular a standardized interface 13 according to the invention can be made if the output 11 provides an industrial three-phase alternating current, for example a three-phase current with frequency 50 Hz and voltage 400 V.

To produce such a three-phase alternating current, the inverter 10 of the supply unit 8 converts the direct voltage applied, for example by the DC intermediate circuit or the high-voltage battery of the electro-hybrid system 3, at the input 9, into a three-phase alternating voltage which is then stepped up or stepped down by the transformer 12 to the voltage level intended, in particular for example to 400 V.

With the three-phase alternating current available at the output 11 of the supply unit 8, which constitutes an output of the power supply device 1, a standardized interface can be formed at the output 11 of the supply unit for example by means of an industrial three-phase alternating-current plug-and-socket connection. In the present case it is envisaged to form the interface 13 by means of an industrial three-phase alternating-current socket (female) at the output 11. The supply unit 8 can for example be of modular design and/or arranged for example on the commercial vehicle trailer or on the commercial vehicle itself. According to the invention it is provided that the supply unit 8 is or can be connected releasably to the electro-hybrid system 3 of the power supply device 1, so that rapid separation/connection from/to the latter can take place without destructive intervention, for example by means of an electric plug-in joint etc., as represented by the index 14.

Figure 2:
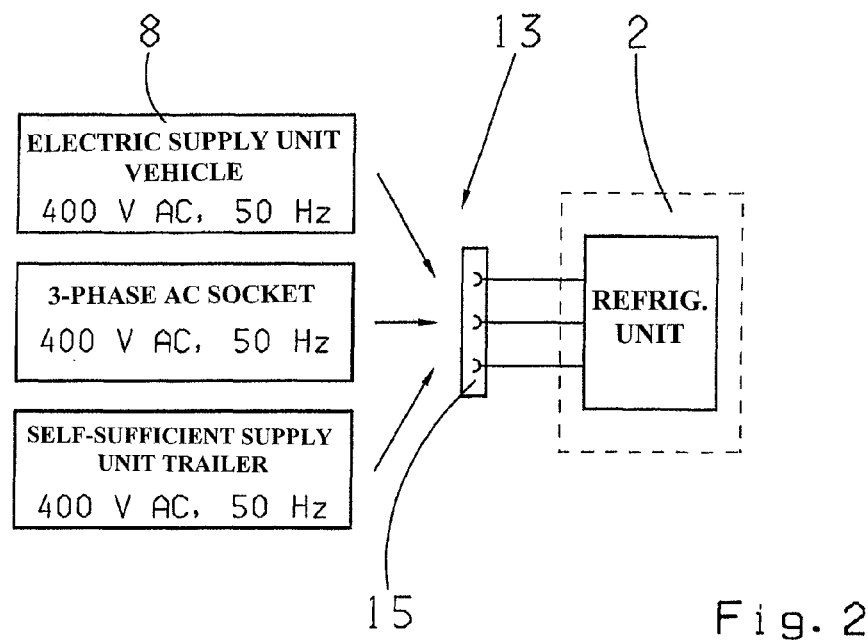
FIG. 2: As an example, power supply devices that can be connected to the input of the unit according to the invention, for supplying electric power to the unit.

To form the standardized interface 13 the unit 2 according to the invention, which for example has a power demand of 10 to 40 kW, comprises in particular a single input 15 designed for example as a three-phase alternating-current input. The input 15 is designed to be fed with industrial three-phase alternating current, for example in the form of a three-phase alternating current, with a frequency of 50 Hz and a voltage of 400 V. To form a standardized interface 13, the input 15 is made in the form of an industrial three-phase alternating-current plug-and-socket connection and in the present case comprises in particular an industrial three-phase alternating-current plug (male) for connection to an industrial three-phase alternating-current socket (female), for example that of the supply device 1, of other power supply devices as in FIG. 2. These other power supply devices can in particular be a stationary industrial three-phase alternating-current socket (female), for example one fitted on or in a building, which for example provides three-phase alternating current at 400 V and 50 Hz, or a self-sufficient electric supply unit of the commercial vehicle trailer, for example an electric generator, which also provides three-phase alternating current for example at 400 V and 50 Hz.

INDEXES

1 Power supply device
2 Refrigerator unit
3 Electro-hybrid drive system
4 High-voltage system 5 High-voltage battery
6 Inverter of the electro-hybrid drive system
7 Electric motor
8 Supply unit
9 Input
10 Inverter of the supply unit
11 Output of the supply unit
12 Transformer
13 Standardized interface
14 Releasable connection
15 Input to refrigerator unit

The invention claimed is:

1. A power supply device (1) for an electrical energy consumer unit (2) that is to be supplied with electrical energy and being arranged on a commercial vehicle trailer, the power supply device (1) comprising:
   an electro-hybrid drive system (3) of a commercial vehicle, comprising a high-voltage battery (5) and a high-voltage system (4) having an inverter (6);
   the inverter (6) of the high-voltage system being electrically connected to the high-voltage battery (5) and an electric motor (7) of the commercial vehicle, such that the inverter (6) of the high-voltage system delivers energy from the high-voltage battery (5) to the electric motor (7);
   the electro-hybrid drive system (3) being directly connected to a supply unit (8) by a plug-in connection (14) for converting a direct voltage, from the high-voltage system (4) of the electro-hybrid drive system (3), into a three-phase alternating voltage;
   the supply unit (8) comprising a supply unit inverter (10), a transformer (12) and an output (11), the transformer (12) being connected downstream from the supply unit inverter (10) and the output (11) being connected downstream from the transformer (12) for transmitting the three-phase alternating voltage and supplying power to the consumer unit (2);
   the transformer (12) is a step up transformer; and
   the output (11) is a standardized interface (13) together with the consumer unit (2).

2. The power supply device (1) according to claim 1, wherein the output (11), forming the interface (13), is an industrial three-phase alternating-current plug-and-socket connection.

3. The power supply device (1) according to claim 1, wherein the output (11), for forming the interface (13), comprises an industrial three-phase alternating-current socket.

4. The power supply device (1) according to claim 1, wherein the supply unit (8) comprises the supply unit inverter (10), for converting the direct voltage into the three-phase alternating voltage, and the transformer (12) for stepping up the three-phase alternating voltage.

5. The power supply device (1) according to claim 1, wherein the supply unit (8) provides, at the output (11) thereof, a three-phase alternating current with a voltage of 400 V and a frequency of 50 Hz.

6. The power supply device (1) according to claim 1, wherein the supply unit (8) is releasably connected to the high-voltage system (4) by a releasable plug-in connection (14).

7. The power supply device (1) according to claim 1, wherein the supply unit (8) is located on one of the commercial vehicle and the commercial vehicle trailer.

8. A power supply device (1) in combination with an electrical energy consumer unit (2) being arranged on a commercial vehicle trailer, the power supply device (1) comprising:
   an electro-hybrid drive system (3) of a commercial vehicle comprising a high-voltage battery (5) and a high-voltage system (4) having an inverter (6);
   the inverter (6) of the high-voltage system being electrically connected to the high-voltage battery (5) and an electric motor (7) of the commercial vehicle, such that the inverter (6) of the high-voltage system delivers energy from the high-voltage battery (5) to the electric motor (7) the electro-hybrid drive system (3) being directly connected to a supply unit (8) by a plug-in connection (14) for converting a direct voltage, from the high-voltage system (4) of the electro-hybrid drive system (3), into a three-phase alternating voltage,
   the supply unit (8) comprising a supply unit inverter (10), a transformer (12) and an output (11), the supply unit inverter being connected to the high-voltage system of the electro-hybrid drive system, the transformer (12) being connected downstream from the supply unit inverter (10) and the output (11) being connected downstream from the transformer (12) for transmitting the three-phase alternating voltage and supplying power to the consumer unit (2), the output (11) being a standardized interface (13) together with the consumer unit (2), and
   the consumer unit (2) comprising a single input (15) which forms the standardized interface (13) with the power supply device (1) to facilitate connection with a desired power supply unit.

9. The power supply device (1) in combination with the consumer unit (2) according to claim 8, wherein the input (15) of the consumer unit (2), for forming the interface (13), is an industrial three-phase alternating-current plug-and-socket connection.

10. The power supply device (1) in combination with the consumer unit (2) according to claim 8, wherein the consumer unit (2), to form the interface (13), comprises an industrial three-phase alternating-current plug.

11. A power supply device (1) which supplies electrical energy to an electrical energy consumer unit (2) being arranged on a commercial vehicle trailer, the power supply device (1) comprising:
   an electro-hybrid drive system (3) of a commercial vehicle comprising a high-voltage battery (5) and a high-voltage system (4) having an inverter (6);
   the inverter (6) of the high-voltage system being electrically connected to the high-voltage battery (5) and an electric motor (7) of the commercial vehicle, such that the inverter (6) of the high-voltage system delivers energy from the high-voltage battery (5) to the electric motor (7);
   the electro-hybrid drive system (3) being directly connected to a supply unit (8) having a supply unit inverter (10), a transformer (12) and an output (11); the transformer (12) being connected downstream from the supply unit inverter (10) and the output (11) being connected downstream from the transformer (12),
   the electro-hybrid drive system (3) comprising the high-voltage system (4) which generates a direct voltage, the direct voltage being transmitted, via a plug-in connection (14), from the electro-hybrid drive system (3) to the supply unit inverter (10),
   the supply unit inverter (10) converting the direct voltage into a three-phase alternating voltage, and
   the consumer unit (2) comprising an input (15) being connected to the output (11) via a standardized interface

(13) such that the consumer unit (2) is supplied with and powered by the three-phase alternating voltage.

* * * * *